US005535658A

United States Patent [19]

Kalosdian

[11] Patent Number: 5,535,658

[45] Date of Patent: Jul. 16, 1996

[54] MUSICAL INSTRUMENT STRING

[76] Inventor: Antonio Kalosdian, 1490 Chicago Ave., Bayshore, N.Y. 11706

[21] Appl. No.: 438,527

[22] Filed: May 10, 1995

[51] Int. Cl.[6] .......... G01D 3/00

[52] U.S. Cl. .......... 84/297 S; 84/199

[58] Field of Search .......... 84/199, 297 S

[56] References Cited

U.S. PATENT DOCUMENTS

| | | | |
|---|---|---|---|
| 2,746,335 | 5/1956 | Johnson | 84/199 |
| 4,184,405 | 1/1980 | How | 84/297 S |
| 4,326,444 | 4/1982 | Markley | 84/297 S |
| 4,365,534 | 12/1982 | Rendell | 84/297 S |
| 4,581,976 | 4/1986 | Ball | 84/297 S |
| 4,854,213 | 8/1989 | Infeld | 84/297 S |

*Primary Examiner*—Patrick J. Stanzione
*Attorney, Agent, or Firm*—Michael I. Kroll

[57] ABSTRACT

An improved musical instrument string comprising a core wire. A plurality of inner wrap wires are helically wound concentrically about a central portion of the core wire. The central portion of the core wire is of an elongated length. An outer wrap wire is helically wound concentrically about the complete length of the inner wrap wires and most of the side portions of the core wire. Opposite ends of the core wire extend outwardly from the outer wrap wire. The outer wrap wire will retain the inner wrap wires in place on the central portion of the core wire, so that the inner wrap wires cannot loosen and will last longer.

9 Claims, 2 Drawing Sheets

MUSICAL INSTRUMENT STRING

BACKGROUND OF THE INVENTION

1. Field of the Invention

The instant invention relates generally to strings for musical instruments and more specifically it relates to an improved musical instrument string for a string instrument.

2. Description of the Prior Art

Numerous strings for musical instruments have been provided in prior art. For example, U.S. Pat. Nos. 4,326,444 to Markley; 4,365,534 to Bendell; 4,581,976 to Ball and 4,854,213 to Infeld all are illustrative of such prior art. While these units may be suitable for the particular purpose to which they address, they would not be as suitable for the purposes of the present invention as heretofore described.

MARKLEY, DONALD D.

MUSICAL INSTRUMENT STRING

U.S. Pat. No. 4,326,444

A musical instrument string having a central core and one or more lengths of wire forming helically wound layers along the length. The outer surface of the string is unaltered from one end to a mid area and from the mid area to the other end of the string. The string has a smooth outer surface.

RENDELL, STANLEY E.

MODIFIED MUSICAL INSTRUMENT STRING

U.S. Pat. No. 4,365,534

A modified musical instrument string comprising a core having a first cover wire helically wound thereon. The cover wire has a substantially round cross section over a major proportion of its surface, but has compressed flats at a crown of the wire at an outer surface of the string, but not at an inner surface of the cover wire. The modification is effected by an apparatus comprising a first roller having a fixed axis and a second roller mounted on a moveable arm for moving the second roller toward and away from the first roller. A controllable air cylinder apparatus is connected to the moveable arm for moving the second roller toward the first roller. As the string being wound and rotating, passes between the two rollers between guides, the crown or outer arcuate surface of the helical winding at the outer surface of the string is flattened by passing the string while it is rotating between rollers bias toward each other. This results in a string which produces less noise when the player slides his fingers along the string to change positions and which still provides perfect intonation and frequency response. The method for modifying such a wound musical instrument string is also disclosed.

BALL, STERLING C.

REINFORCED MUSICAL INSTRUMENT STRING

U.S. Pat. No. 4,581,976

A musical instrument string includes a core wire, preferably round in cross section, and is bent a short distance from one end thereof to form a loop. The end segment of the core wire is twisted together with a second segment of the core wire that is adjacent the loop, to form a looped end on the musical instrument string and a twisted segment adjacent the looped end. A wrap wire wound tightly around the twisted segment of the core wire reinforces the string against breakage at the twisted segment. The length of the wrapped section of the core wire is a small fraction of the overall length of the core wire and musical instrument string. When the string is installed on the instrument, the wrapped portion does not extend beyond the bridge.

INFELD, PETER

MUSIC STRING

U.S. Pat. No. 4,854,213

A music string consisting essentially of a core composed of aramide fibers and a wound sheath on the core.

SUMMARY OF THE INVENTION

A primary object of the present invention is to provide an improved musical instrument string that will overcome the shortcomings of the prior art devices.

Another object is to provide an improved musical instrument string that consists of a core wire, a plurality of inner wrap wires helically wound concentrically about the core wire and an outer wrap wire which covers all of the inner wrap wires and most of the core wire, whereby the outer wrap wire will retain the inner wrap wires in place, so that they cannot loosen and will last longer.

An additional object is to provide an improved musical instrument string, in which the lower and upper portions of the core wire with the outer wrap wire will sit upon the bridge and the nut bar for a better balance, so that the weighted central portion therebetween with the inner wrap wires, will vibrate more and have a more distinct and a better response, with more sustain and less muddy bottoms.

A further object is to provide an improved musical instrument string that is simple and easy to use.

A still further object is to provide an improved musical instrument string that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 1 is a perspective view of a string instrument having a string in accordance with the present invention mounted thereon.

FIG. 2 an enlarged perspective view of the string instrument, showing a portion of the string in greater detail.

Figure 1:
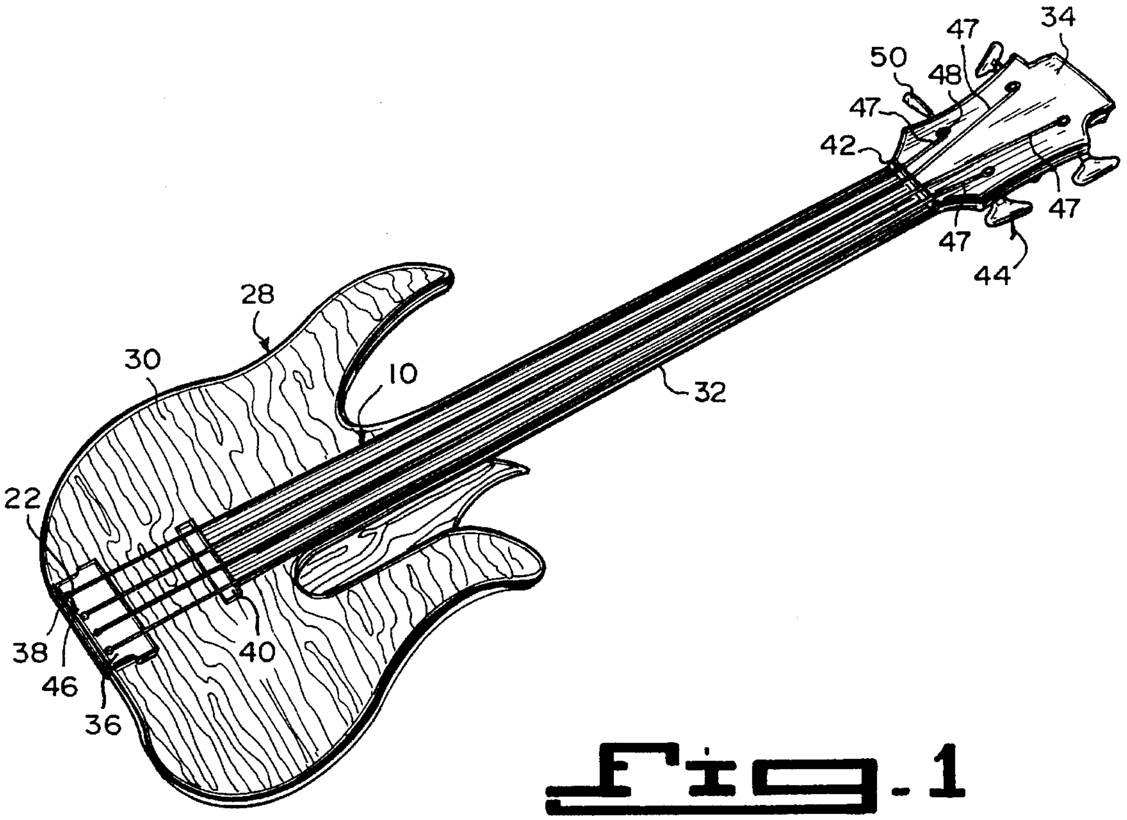
Figure 2:
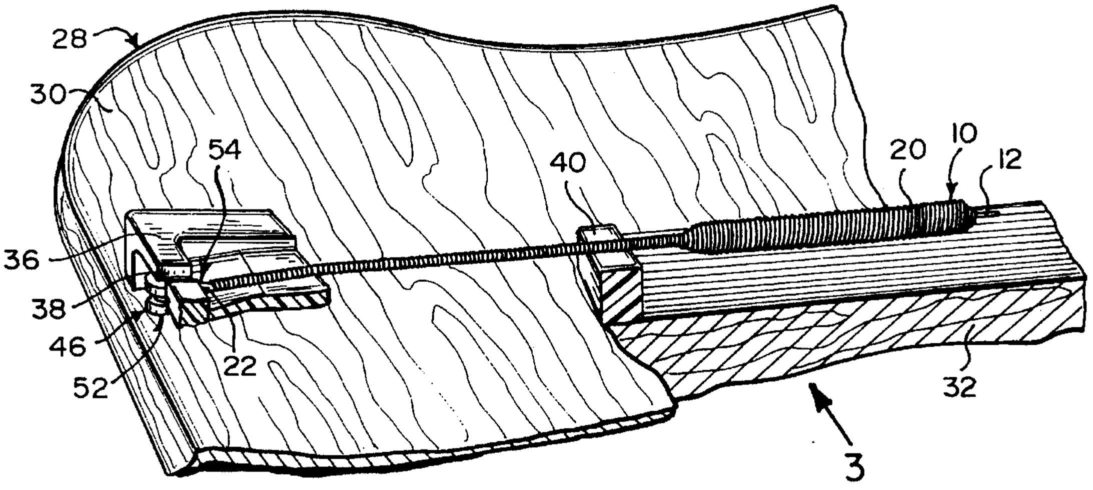
Figure 3:
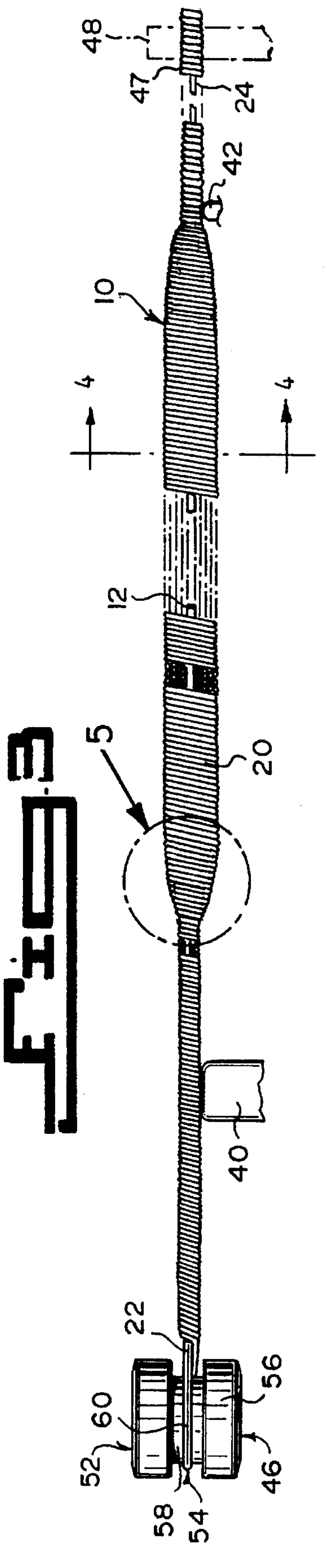
FIG. 3 is an enlarged elevational view taken in the direction of arrow 3 in FIG. 2, with parts broken away.
Figure 5:
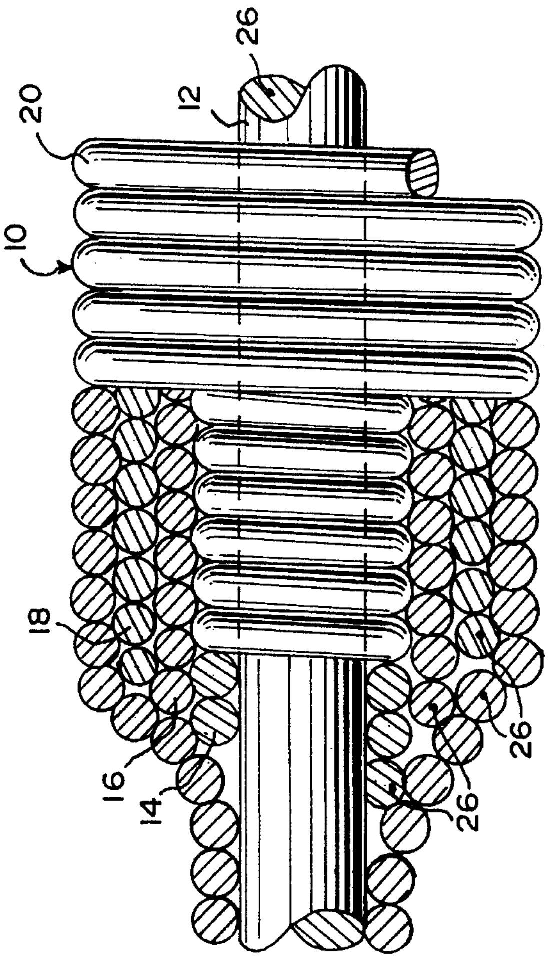

FIG. 5 a further enlarged elevational view with parts broken away and in section, as indicated by arrow 5 in FIG. 3.

Similar reference characters denote corresponding features consistently throughout the attached drawings.

DETAILED DESCRIPTION OF THE PREFERRED EMBODIMENTS

Turning now descriptively to the drawings, in which similar reference characters denote similar elements throughout the several views, FIGS. 1 through 5 illustrate an improved musical instrument string 10, comprising a core 12. A plurality of inner wrap wires 14, 16, 18 are wound concentrically about a central portion of the core wire 12. The central portion of the core wire 12 is of an elongated length.

An outer wrap wire 20 is helically wound concentrically about the complete length of the inner wrap wires 14, 16, 18 and most of the side portions of the core wire 12. Opposite ends 22, 24 of the core wire 12 extend outwardly from the outer wrap wire 20. The outer wrap wire 20 will retain the inner wrap wires 14, 16, 18 in place on the central portion of the core wire 12, so that the inner wrap wires 14, 16, 18 cannot loosen and will last longer.

The core wire 12 is fabricated out of a metal material 26. The inner wrap wires 14, 16, 18 are fabricated out of the metal material 26. The outer wrap wire 20 is also fabricated out of the metal material 26.

The inner wrap wires 14, 16, 18 are three in a plurality and includes the first wrap wire 14 helically wound about the core wire 12. The second wrap wire 16 is helically wound about the first wrap wire 14 and is slightly set back from opposite ends of the first wrap wire 14. The third wrap wire 18 is helically wound about the second wrap wire 16 and is slightly set back from opposite ends of the second wrap wire 16.

Figure 4:
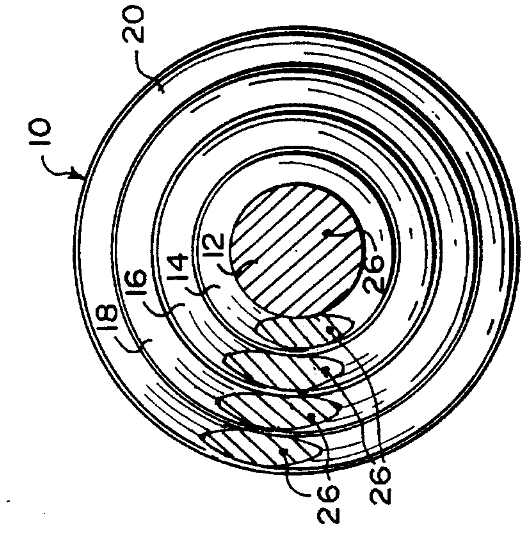
FIG. 4 is a further enlarged cross sectional view taken along line 4—4 in FIG. 3.

The inner wrap wires, as best seen in FIGS. 4 and 5, are three in number and are thus illustrated for example only. Any number of inner wrap wires can be utilized in combination with the core wire 12 and the outer wrap wire 20 in this invention.

The improved musical instrument string 10 is used in combination with a string instrument 28. The string instrument 28 consists of a body 30, with a neck 32 extending from the body 30. A head 34 on a remote end of the neck 32 is in spaced relationship to the body 30. A tailpiece 36 having a slotted end 38 is on the body 30, while a bridge 40 is also on the body 38. A nut bar 42 is between the remote end of the neck 32 and the head 34. A plurality tuning machines 44 are carried in the head 34.

A structure 46 is for anchoring the first end 22 of the core wire 12 to the tailpiece 36. The lower side portion of the core wire 12 with the outer wrap wire 20 can sit upon the bridge 40. The upper side portion of the core wire 12 with the outer wrap wire 20 can sit upon the nut bar 42. The second end 24 of the core wire 12 in combination with a portion of the outer wrap wire 20 as indicated by numeral 47, is in engagement with one tuning machine 44, so as to be pulled taut. This allows the central portion of the core wire 12 with the inner wrap wires 14, 16, 18 and the outer wrap wire 20, to vibrate more between the bridge 40 and the nut bar 42, while having a more distinct and better response, with more sustain and less muddy bottoms.

Each tuning machine 44 includes a tuning machine post 48 in the head 34, to engage with the second end 24 of the core wire 12 in combination with the portion of the outer wrap wire 20, as indicated by the numeral 47. A tuning key 50 extends from one side of the head 34 and is in rotative contact with the tuning machine post 48. When the tuning key 50 is manually operated, it will turn the tuning machine post 48 to pull taut the core wire 12 in combination with the portion of the outer wrap wire 20, as indicated by the numeral 47.

The anchoring structure 46 consists of a ball 52 and a facility 54, for connecting the ball 52 to the first end 22 of the core wire 12. The ball 52 can fit into and be held within the slotted end 38 of the tailpiece 36 on the body 30. The ball 52 is a spool shaped member 56, having an annular groove 58 thereabout. The connecting facility 54 includes the first end 22 of the core wire 12 bent and doubled back onto itself, to form a closed loop 60. The loop 60 can extend about the annular groove 58 in the spool shaped member 56.

OPERATION OF THE INVENTION

To install the improved musical instrument string 10 on the string instrument 28, the following steps should be taken:

1. Insert the spool shaped member 56 with the closed loop 60 into the slotted end 38 of the tailpiece 36.
2. Extend the lower side portion of the core wire 12 with the outer wrap wire 20 away from the tailpiece 36, so that it can sit upon the bridge 40.
3. Position the upper side portion of the core wire 12 with the outer wrap wire 20, so that it can sit upon the nut bar 42.
4. Engage the second end 24 of the core wire 12 with the tuning machine post 48 of one tuning machine 44.
5. Tighten the turning key 50, so that the tuning machine post 48 will turn to pull taut the core wire 12 in combination with a portion of the wrap wire 20, as indicated by numeral 40, so that the central portion of the core wire 12, with the inner wrap wires 14, 16, 18 and the outer wrap wire 20 will vibrate more between the bridge 40 and the nut bar 42.

LIST OF REFERENCE NUMBERS

10 improved musical instrument string
12 core wire of 10
14 first wrap wire of 10
16 second wrap wire of 10
18 third wrap wire of 10
20 outer wrap wire of 10
22 first end of 12
24 second end of 12
26 metal material of 12, 14, 16, 18 and 20
28 string instrument
30 body of 28
32 neck of 28
34 head of 28
36 tailpiece of 28
38 slotted end of 36
40 bridge of 28

42 nut bar of 28

44 tuning machine of 28

46 anchoring structure 47 combination of 24 and a portion of 20

48 tuning machine post of 44

50 tuning key of 44

52 ball of 46

54 connecting facility of 46

56 spool shaped member for 52

58 annular groove in 56

60 closed loop for 54

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved musical instrument string in combination with a string instrument comprising:

a) a string instrument comprising a body, a neck extending from said body, a head on a remote end of said neck in spaced relationship to said body, a tailpiece having a slotted end on said body, a bridge on said body, a nut bar between the remote end of said neck and said head, a plurality of tuning machines carried in said head, a core wire extending from each of said tuning machines to said tail piece, and means for anchoring said core wire on said tailpiece;

b) a plurality of inner wrap wires, helically wound concentrically about said core wire between and spaced from said nut bar and said bridge; and c) an outer wrap wire helically wound concentrically about the complete length of said inner wrap wires and most of the end portions of each said core wire the outer wrap beginning at the first end of said core wire adjacent said mounting means to and engaging each said tuning machine at the second end of said core wire for preventing said inner wrap wires from loosening and providing in the notes produced by said string instrument a more distinct and better response with more sustain and less muddy bottoms.

2. An improved musical instrument string as recited in claim 1, wherein said core wire is fabricated out of a metal material.

3. An improved musical instrument string as recited in claim 1, wherein each of said inner wrap wires is fabricated out of a metal material.

4. An improved musical instrument string as recited in claim 1, wherein said outer wrap wire is fabricated out of a metal material.

5. An improved musical instrument string as recited in claim 1, wherein said inner wrap wires include:

a) a first wrap wire helically wound about said core wire;

b) a second wrap wire helically wound about said first wrap wire and slightly set back from opposite ends of said first wrap wire; and c) a third wrap wire helically wound about said second wrap wire and slightly set back from opposite ends of said second wrap wire.

6. An improved musical instrument string as recited in claim 5, wherein each said tuning machine includes:

a) a tuning machine post in said head to engage with the second end of said core wire in combination with the portion of said outer wrap wire; and b) a tuning key extending from one side of said head and in rotative contact with said tuning machine post, so that when said tuning key is manually operated, it will turn said tuning machine post to pull taut said core wire in combination with the portion of said outer wrap wire.

7. An improved musical instrument string as recited in claim 6, wherein said anchoring means includes:

a) a ball; and b) means for connecting said ball to the first end of said core wire, so that the ball can fit into and be held within the slotted end of said tailpiece on said body.

8. An improved musical instrument string as recited in claim 7, wherein said ball is a spool shaped member having an annular groove thereabout.

9. An improved musical instrument string as recited in claim 8, wherein said connecting means includes the first end of said core wire bent and doubled back onto itself to form a closed loop, so that said loop can extend about said annular groove in said spool shaped member.

* * * * *